(12) United States Patent
Rick

(10) Patent No.: US 9,254,814 B2
(45) Date of Patent: Feb. 9, 2016

(54) ELASTIC STRUCTURE FOR USE IN AN ENERGY ABSORPTION SYSTEM OF A MOTOR VEHICLE AS WELL AS ENERGY ABSORPTION SYSTEM AS OCCUPANT PROTECTION AND/OR PEDESTRIAN PROTECTION

(71) Applicant: GM GLOBAL TECHNOLOGY OPERATIONS LLC, Detroit, MI (US)

(72) Inventor: Ulrich Rick, Braunweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/773,889

(22) Filed: Feb. 22, 2013

(65) Prior Publication Data

US 2014/0175777 A1    Jun. 26, 2014

(30) Foreign Application Priority Data

Dec. 24, 2012   (DE) .......................... 10 2012 003 806

(51) Int. Cl.

| B60R 21/36 | (2011.01) |
|---|---|
| B60R 21/23 | (2006.01) |
| B60R 21/34 | (2011.01) |
| B60R 19/20 | (2006.01) |
| B60R 21/16 | (2006.01) |
| B60R 21/04 | (2006.01) |
| B60R 21/235 | (2006.01) |

(52) U.S. Cl.
CPC ............... *B60R 21/36* (2013.01); *B60R 19/205* (2013.01); *B60R 21/16* (2013.01); *B60R 21/23* (2013.01); *B60R 21/34* (2013.01); *B60R 2021/0407* (2013.01); *B60R 2021/23519* (2013.01)

(58) Field of Classification Search
CPC ............................ B60R 21/201; B60R 21/237
USPC ................. 280/729, 730.1, 730.2, 732, 743.1
See application file for complete search history.

(56) References Cited

U.S. PATENT DOCUMENTS

| 3,802,719 A | * | 4/1974 | Brown ........................ 280/729 |
| 4,441,751 A | * | 4/1984 | Wesley ..................... 296/180.1 |
| 4,657,516 A | * | 4/1987 | Tassy ............................. 441/125 |
| 5,104,727 A | * | 4/1992 | Wnenchak .................... 442/268 |

(Continued)

FOREIGN PATENT DOCUMENTS

| DE | 19546143 A1 | 6/1997 |
| DE | 102006054392 A1 | 5/2008 |

(Continued)

OTHER PUBLICATIONS

German Patent Office, German Search Report for Application No. 102012003806.2, dated Dec. 3, 2012.

*Primary Examiner* — Paul N Dickson
*Assistant Examiner* — Darlene P Condra
(74) *Attorney, Agent, or Firm* — Ingrassia Fisher & Lorenz PC

(57) ABSTRACT

An elastic structure for use in an energy absorption system of a motor vehicle is provided. The elastic structure includes a structure configured as occupant protection and/or pedestrian protection expandable by a medium. An elastic function structure at least partially covers the structure and acts as a gas barrier. An energy absorption system for a motor vehicle as occupant protection and/or pedestrian protection and a motor vehicle having at least one such energy absorption system are also provided.

10 Claims, 1 Drawing Sheet

(56) References Cited

U.S. PATENT DOCUMENTS

| | | | |
|---|---|---|---|
| 5,240,283 A * | 8/1993 | Kishi et al. | 280/729 |
| 5,879,767 A | 3/1999 | Matsushima et al. | |
| 6,742,805 B2 * | 6/2004 | Hill | 280/730.2 |
| 6,759,355 B2 * | 7/2004 | Nagaoka et al. | 442/164 |
| 6,971,674 B2 * | 12/2005 | Johansson | 280/743.1 |
| 7,267,367 B2 * | 9/2007 | Barvosa-Carter et al. | 280/753 |
| 7,341,769 B2 * | 3/2008 | Barnes | 428/35.2 |
| 7,562,899 B2 * | 7/2009 | Hill et al. | 280/728.1 |
| 7,669,882 B2 * | 3/2010 | Karlow et al. | 280/728.2 |
| 7,775,551 B2 * | 8/2010 | Bowers | 280/729 |
| 7,934,750 B2 * | 5/2011 | Naruse et al. | 280/743.1 |
| 8,088,695 B1 * | 1/2012 | Press et al. | 442/104 |
| 8,851,517 B2 | 10/2014 | Rick | |
| 9,120,459 B2 | 9/2015 | Rick | |
| 2003/0166367 A1 | 9/2003 | Berger et al. | |
| 2006/0066088 A1 * | 3/2006 | Hier et al. | 280/743.1 |
| 2006/0121221 A1 * | 6/2006 | Aketa et al. | 428/35.4 |
| 2007/0031621 A1 * | 2/2007 | Morimoto et al. | 428/36.1 |
| 2009/0179410 A1 * | 7/2009 | Schindzielorz | 280/743.1 |
| 2009/0314378 A1 * | 12/2009 | Huber et al. | 139/389 |
| 2010/0270780 A1 * | 10/2010 | Moritani | 280/730.1 |
| 2010/0295283 A1 * | 11/2010 | Yamada et al. | 280/743.1 |
| 2012/0043783 A1 * | 2/2012 | Todd | 296/187.03 |

FOREIGN PATENT DOCUMENTS

| | | | |
|---|---|---|---|
| GB | 1319389 A | | 6/1973 |
| JP | 2185843 A | | 7/1990 |

* cited by examiner

ELASTIC STRUCTURE FOR USE IN AN ENERGY ABSORPTION SYSTEM OF A MOTOR VEHICLE AS WELL AS ENERGY ABSORPTION SYSTEM AS OCCUPANT PROTECTION AND/OR PEDESTRIAN PROTECTION

CROSS-REFERENCE TO RELATED APPLICATION

This application claims priority to German Patent Application No. 10 2012 003 806.2, filed Feb. 24, 2012, which is incorporated herein by reference in its entirety.

TECHNICAL FIELD

The technical field relates to an elastic structure for use in an energy absorption system of a motor vehicle, wherein the elastic structure is expandable by a medium into a structure which serves as occupant protection and/or pedestrian protection. The technical field, furthermore, relates to an energy absorption system for a motor vehicle as occupant protection and/or pedestrian protection.

BACKGROUND

Energy absorption systems make possible an absorption of impact energy in the event of a crash and usually serve for the protection of vehicle occupants and/or pedestrians in or on a motor vehicle.

Usually, energy absorption systems comprise a plastic bag or fabric bag, which in the event of an accident is suddenly inflated between the occupants and parts of the vehicle interior or between a pedestrian and a bodywork part of the motor vehicle. Because of this it is prevented that the occupants or the pedestrian crash into hard parts of the motor vehicle.

In more recent energy absorption systems, such plastic or fabric bags are no longer used. Instead, the energy absorption systems have an elastic structure, which in the event of a crash can be inflated like a balloon by a gaseous medium, thus forming a structure which acts as occupant protection and/or pedestrian protection. Compared with the conventional plastic bag or fabric bag, the elastic structure has the advantage that it requires less installation space, has a lower weight and is more cost effective. The elastic structure can also be reused, since it substantially returns to its original shape when the gaseous medium has disappeared.

In practice, it has been shown, however, that the elastic structure with increasing lifespan is subject to ageing caused through environmental influences, which become noticeable through the formation of minute pores and/or cracks. The consequence of this is that the elastic structure in the event of a crash no longer expands to the aspired volume since the elastic structure through the minute pores or cracks increasingly becomes permeable to gas. A safe functionality of the elastic structure in an energy absorption system can thus no longer be adequately guaranteed from a certain degree of ageing, so that the elastic structure has to be replaced with a new elastic structure even at an early stage. However, a premature and frequent replacement of the elastic structure in turn brings about unintentional additional costs.

It is at least one object herein to take measures by means of which, in the case of energy absorption systems with an elastic structure having the features mentioned at the outset, an adequate functionality of the elastic structure is maintained intact for longer than previously.

SUMMARY

In an exemplary embodiment, an elastic structure for use in an energy absorption system of a motor vehicle is expandable by a medium, in particular a gaseous medium or a liquid medium into a structure serving as occupant protection and/or pedestrian protection. The elastic structure is at least partially covered by an elastic function structure acting as gas barrier.

Through this measure, the functionality of the elastic structure is maintained intact to an adequate degree despite any ageing manifestations in order to be able to serve as occupant protection or pedestrian protection. Through the function structure it is ensured that even in the case of a porosity due to ageing the elastic structure in the event of a crash can be expanded by the medium so far that it adequately fulfills its function as occupant protection or pedestrian protection. The function structure which acts as gas barrier in this case counteracts the escape of the medium via the cracks and pores due to ageing. Through the elasticity of the function structure, the function structure can expand together with the elastic structure in the event of a crash, so that despite the function structure the elastic structure expands into the structure which serves as occupant protection or pedestrian protection.

As contemplated herein, it is also avoided that on activating the energy absorption system and the concomitant loading of the elastic structure by the medium a part of the medium escapes to the outside into the passenger compartment of the motor vehicle through minor cracks and pores in the elastic structure. Such an aspect has a high relevance to the case that the medium is environmentally harmful and/or harmful to health.

According to an exemplary embodiment, the function structure is arranged on the outside of the elastic structure. Because of this, the elastic structure is protected towards the outside through the function structure and thus acts as protection against environmental influences acting from the outside. Because of this, the function structure protects the elastic structure for example against mechanical influences from the outside. The function structure also protects the elastic structure against some radiation, UV-radiation, moisture, temperature fluctuations and/or similar effects. The function structure thus counteracts any ageing manifestations of the elastic structure, in particular, ageing manifestations on the elastic structure are prevented or at least delayed.

The outside, as contemplated herein, is to mean the side of the elastic structure facing outward, to the surroundings, when it is in the installed state or located on an energy absorption system. The function layer located outside can additionally act as decorative layer, for example in that the function layer is colored with color pigments.

Obviously, the function structure can also be arranged on the inside of the elastic structure. A particularly good gas barrier is realized because of this, which is highly active with high internal pressure as it is built-up by the medium in the event of a crash.

According to another embodiment, the function structure is arranged on the outside and on the inside of the elastic structure. Because of this, the function structure acts particularly effectively as gas barrier against the medium, which loads the elastic structure in the event of a crash and additionally expands a structure acting as pedestrian protection or occupant protection. At the same time, the function structure located outside, which is assigned to the outside of the elastic structure, acts as protection against environmental influences or mechanical influences acting on the elastic structure from the outside and thus prevents any possible ageing manifestations, damages or even a destruction of the elastic structure.

The measure of a further embodiment, according to which the function structure envelopes the elastic structure aims in the same direction. The elastic structure is thus substantially completely surrounded or enclosed by the function structure.

In a further embodiment, the function structure is formed as layer, in particular coating applied to the elastic structure. For example, the function structure and elastic structure are areally connected to one another. By forming the function structure as a layer or coating and the areal connection of function structure and elastic structure, both structures form a unit which can be industrially prefabricated. Such an already prefabricated unit reduces the installation effort of the function structure in the energy absorption system, since it is already attached to the elastic structure. By connecting the function structure to the elastic structure, a permanent and fixed connection is additionally realized. Preferably, the function structure and the elastic structure in this case are non-separably interconnected production-wise.

In order to optimally maintain the functionality of the elastic structure, the function structure has substantially same elastic characteristics as the elastic structure. Alternatively, the function structure can obviously be also more elastic than the elastic structure.

According to an embodiment, the elastic structure consists of at least one elastomer, in particular rubber. Because of this, the elastic structure is particularly suited for utilization in an energy absorption system.

According to a further embodiment, the function structure consists of silicone. Because of this, the function structure is gas impermeable or at least largely gas impermeable, so that an escaping of medium from the expansion space of the energy absorption system is stopped completely or at least substantially completely.

The function structure can be formed through a layer or a film of silicone grease, silicone resin or silicone oil. Such a function structure is opportune if the function structure, together with the elastic structure wholly or partly encapsulated, are installed in the interior of a motor vehicle or are accommodated in a protected manner in any other region of a component or a unit and merely minor external influences thus act on the elastic structure and thus also on the applied function structure.

Preferably, such a function structure is arranged on the outside of the elastic structure, since because of this a simple accessibility to the elastic structure is provided and thus a thin film or a layer of silicone grease, silicone resin or silicone oil can be applied in a particularly simple manner.

In principle, any type of material that is elastically acting as gas barrier can be used as material for the function structure. The function structure can be formed from at least one elastomer, such as for example rubber. The function structure can also consist of synthetic polymers other than silicone.

According to a further embodiment, an energy absorption system for a motor vehicle as occupant protection and/or pedestrian protection is provided. The energy absorption system comprises at least one elastic structure of the type described above.

According to another embodiment, an energy absorption system for a motor vehicle as occupant protection and/or pedestrian protection with an elastic structure is provided. The elastic structure is held on a housing or support and is expandable by a medium, in particular a gaseous or liquid medium into a structure serving as occupant protection and/or pedestrian protection.

Such an energy absorption system has an elastic function structure acting as gas barrier, which is held on the housing or carrier subject to the formation of a hollow space receiving the elastic structure.

Through this measure, an encapsulation of the elastic structure is realized. The functionality of the elastic structure is maintained intact to an adequate degree in order to serve as occupant protection or pedestrian protection despite any ageing manifestations. Through the function structure, it is ensured that even with a porosity of the elastic structure that occurs due to ageing the medium in the event of a crash the elastic structure is expanded by the medium until it adequately fulfills its function as occupant protection or pedestrian protection. The function structure which acts as gas barrier in this case counteracts the escaping of the medium through cracks and pores due to ageing in the elastic structure. Through the elasticity of the function structure, the function structure can expand with the elastic structure in the event of a crash, so that despite the function structure the elastic structure additionally expands into the structure serving as occupant protection or pedestrian protection.

Because of this it is also avoided that on activating the energy absorption system and the concomitant loading of the elastic structure by the medium a part of the medium escapes to the outside into the passenger compartment of the motor vehicle through small cracks and pores in the elastic structure. Such an aspect is highly relevant to the case that the medium is environmentally harmful and/or harmful to health.

In addition to this, the elastic structure is protected towards the outside by the function structure. The function structure thus acts as protection against environmental influences acting from the outside of mechanical influences from the outside. For example, the function structure protects the elastic structure against some radiation, UV-radiation, moisture, temperature fluctuations and/or similar effects.

According to an embodiment, the hollow space is formed through the function structure alone or through the function structure and the housing or the support. Because of this, the hollow space is realized in a technically simple manner.

The function structure can be more elastic than the elastic structure or the function structure and the elastic structure can have substantially the same characteristics. Because of this, the functionality of the elastic structure is optimally maintained.

In an embodiment, the elastic structure also consists of at least one elastomer, in particular rubber.

In another embodiment, the function structure consists of silicone, in particular is formed of silicone resin. Because of this, the function structure is gas impermeable or at least largely gas impermeable, so that the function structure can completely or at least substantially completely stop medium escaping from the expansion space of the energy absorption system.

Obviously, the function structure can be formed of any type of elastic material acting as a gas barrier. In this respect, the function structure can also consist of at least one elastomer, for example rubber or a synthetic polymer other than silicone.

Furthermore, a motor vehicle having at least one energy absorption system of the type described above is provided. The energy absorption system is provided in the motor vehicle and/or on the motor vehicle as measure for the occupant protection and/or pedestrian protection.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

Figure 1:
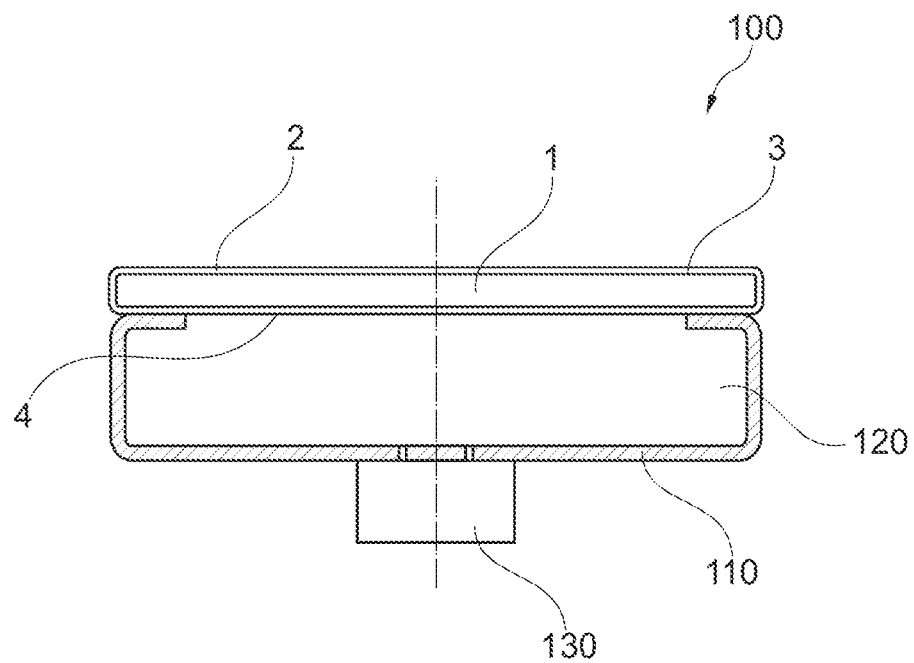
FIG. 1 is cross-sectional view of an energy absorption system for a motor vehicle for the purpose of occupant protection and/or pedestrian protection in accordance with an exemplary embodiment.

FIG. 1 is a cross-sectional view of an energy absorption system 100 in accordance with an exemplary embodiment, which for example can be employed in or on a motor vehicle for the purpose of the occupant protection and/or pedestrian protection. The energy absorption system 100 has a housing 110, on which an elastic structure 1 is arranged. Upon an activation of the energy absorption system 100, the elastic structure 1 is expanded into a structure which protects pedestrians or occupants from crashing against hard parts of the motor vehicle, for example components of the passenger compartment or of the vehicle body. To this end, the energy absorption system 100 is preferably arranged in or on the motor vehicle in the manner that after triggering the energy absorption system the structure generated through expansion of the elastic structure comes to lie between the pedestrian or occupant and the vehicle component, thus absorbing the impact energy which acts on the occupant or the pedestrian in the event of a crash.

As is evident from FIG. 1, the housing 110 can be formed through a body forming a hollow space, which is open towards a side. The open side can be covered by the elastic structure 1, wherein the elastic structure 1 is preferably fastened to the walls of the housing 110. On the housing 110, a gas generator 130 can be arranged, which when activated generates a gaseous medium and on its activation forces the gaseous medium into the interior of the housing 110. Via the interior of the housing 110, which acts as expansion chamber 120, the gaseous medium is loaded against the elastic structure 1, which is expanded by the pressure of the gaseous medium from a starting form into an end form (not show in the FIG. 1), which forms the structure acting as occupant protection and/or pedestrian protection.

It is provided that the elastic structure 1 at least on its outside 3 comprises an elastic function structure 2. As is evident from FIG. 1, the elastic function structure 2 can also envelope the elastic structure 1, thus be provided both on the outside 3 as well as on the inside 4 of the elastic structure 1.

The elastic function structure 2 in this case acts as gas barrier, so that any minor cracks or pores in the elastic structure 1, which for example occur through ageing manifestations, are covered by the function structure 2 and an escaping of the gaseous medium from the elastic structure 1 is thus counteracted or avoided.

In an embodiment, the function structure 2 is formed more elastically than the elastic structure 1. The function structure 2 can also have at least substantially the same elastic characteristics as the elastic structure 1. Because of this, the expansion behavior of the elastic structure 1 upon activation of the energy absorption system 100 is not impaired through the function structure 2.

The function structure 2 can be formed as a layer on the elastic structure 1. The function structure 2 preferably consists of silicone. The function structure 2 can for example be applied to the elastic structure 1 through a layer or a film of silicone grease, silicone resin or silicone oil.

Such a function structure 2 can be applied both to the outside 3 as well as to the inside 4 of the elastic structure 1.

The elastic structure 1 in an embodiment consists of an elastomer, such as for example rubber.

Figure 2:
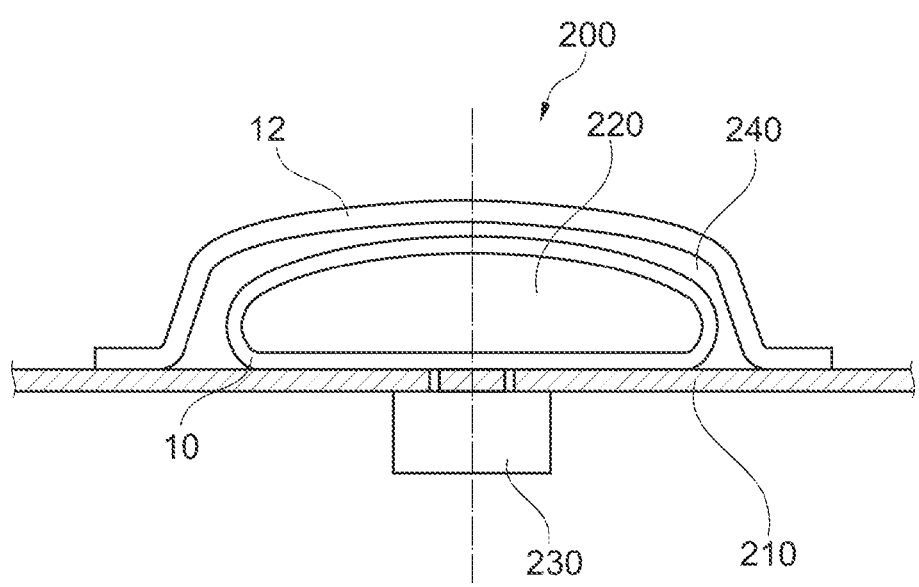
FIG. 2 is cross-sectional view of an energy absorption system for a motor vehicle for the purpose of the occupant protection and/or pedestrian protection in accordance with another exemplary embodiment.

FIG. 2 is a cross-sectional view of a further embodiment of an energy absorption system 200, which can be employed in or on a motor vehicle for the purpose of pedestrian protection and/or occupant protection.

The energy absorption system 200 has an elastic structure 10, which is held on a support 210 and by a gaseous medium can be expanded into a structure which serves as occupant protection and/or pedestrian protection.

Like the energy absorption system 100 before, the energy absorption system 200 also has an elastic function structure 12 which serves as gas barrier. In the case of the energy absorption system 200, the function structure 12 is held on the support 210 subject to form a hollow space 240 receiving the elastic structure 10. The hollow space 240 in this case is formed through the function structure 12 and the support 210, within which the elastic structure 10 is located.

The elastic structure 10 with the embodiment according to FIG. 2 is a structure enclosed within itself, the interior of which forms an expansion chamber 220, in which the gaseous medium is generated and forced in by a gas generator 230 arranged on the support 210, after the energy absorption system 200 has been activated. In that the gaseous medium flows into the expansion chamber 220, the elastic structure 10 expands and presses against the elastic function structure 12, which then likewise expands until the expansion chamber 220 has a volume of such large size that the structure serving as pedestrian protection or occupant protection is created.

In the case of the energy absorption system 200, the function structure 12 is connected at its ends or end regions to the support 210 in a fixed manner or fastened thereto.

The function structure 12 preferably consists of silicone. The elastic structure 10 preferably consists of an elastomer, such as for example rubber.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An elastic structure for use in an energy absorption system of a motor vehicle, the elastic structure configured as occupant protection or pedestrian protection expandable by a medium in the way of stretching material of the elastic structure, the elastic structure comprising:
    an elastic function structure that at least partially covers the elastic structure and acts as a gas barrier;
    wherein the elastic function structure comprises a layer applied to the elastic structure;
    wherein the elastic structure comprises at least one elastomer;

wherein the elastic function structure is arranged on the outside and on the inside of the elastic structure, creating a permanent and fixed connection between the elastic function structure and the elastic structure; and wherein the elastic function structure is more elastic than the elastic structure.

2. The elastic structure according to claim 1, wherein the elastic function structure envelopes the elastic structure.

3. The elastic structure according to claim 1, wherein the elastic structure comprises rubber.

4. The elastic structure according to claim 1, wherein the elastic function structure comprises silicone.

5. The elastic structure according to claim 4, wherein the elastic function structure comprises a silicone grease, a silicone resin, or a silicone oil.

6. An energy absorption system for a motor vehicle as occupant protection and/or pedestrian protection having an elastic structure configured as occupant protection or pedestrian protection, the elastic structure expandable by a medium in the way of stretching material of the elastic structure, the elastic structure comprising:

an elastic function structure that acts as a gas barrier and is held on a housing or support forming a hollow space receiving the elastic structure, wherein the elastic function structure comprises an encapsulation of the elastic structure, and wherein the elastic function structure comprises a silicone material;

wherein the elastic structure is held on the housing or support;

wherein the elastic structure comprises a rubber material; and wherein the elastic function structure is more elastic than the elastic structure.

7. The energy absorption system according to claim 6, wherein the hollow space is formed through the elastic function structure alone or through the elastic function structure and the housing or support.

8. The energy absorption system according to claim 6, wherein the silicone material comprises silicone resin.

9. A motor vehicle having at least one energy absorption system with an elastic structure configured as occupant protection or pedestrian protection, the elastic structure expandable by a medium, the elastic structure comprising:

an elastic function structure that acts as a gas barrier and is held on a housing or support forming a hollow space receiving the elastic structure, wherein the elastic structure comprises at least one elastomer, and wherein the elastic function structure comprises an encapsulation of the elastic structure;

wherein the elastic function structure comprises a silicone material;

wherein the elastic structure is held on the housing or support;

wherein the elastic structure comprises a rubber material; and wherein the elastic function structure is more elastic than the elastic structure.

10. The energy absorption system according to claim 9, wherein the hollow space is formed through the elastic function structure alone or through the elastic function structure and the housing or support.

* * * * *